United States Patent [19]

Glaise et al.

[11] Patent Number: 4,931,985
[45] Date of Patent: Jun. 5, 1990

[54] PROGRAMMABLE SEQUENCING DEVICE FOR CONTROLLING FAST COMPLEX PROCESSES

[75] Inventors: René J. Glaise, Nice; Pierre Huon, St. Laurent du Var, both of France

[73] Assignee: International Business Machines Corporation, Armonk, N.Y.

[21] Appl. No.: 171,503

[22] Filed: Mar. 21, 1988

[30] Foreign Application Priority Data

Apr. 22, 1987 [EP] European Pat. Off. ........ 87430013.0

[51] Int. Cl.[5] .......................................... G05B 19/04
[52] U.S. Cl. .................................. 364/900; 364/921; 364/926.9; 364/926.5
[58] Field of Search ................ 364/900 MS File, 140, 364/141

[56] References Cited

U.S. PATENT DOCUMENTS

| | | | |
|---|---|---|---|
| 3,824,378 | 7/1974 | Johnson et al. | 235/92 |
| 4,021,651 | 5/1977 | Mitsuhashi et al. | 364/900 |
| 4,142,246 | 2/1979 | Fumihiko et al. | 364/900 |
| 4,575,583 | 3/1986 | Kartalopoulos | 179/18 |
| 4,663,730 | 5/1987 | Ikeda | 364/900 |
| 4,748,552 | 5/1988 | Seino | 364/140 |

FOREIGN PATENT DOCUMENTS 187985 12/1983 European Pat. Off.
3106525 12/1981 Fed. Rep. of Germany

OTHER PUBLICATIONS

IBM TDB, vol. 20, No. 2, Jul. 1977 (pp. 743-744).

Primary Examiner—Thomas M. Heckler
Attorney, Agent, or Firm—Joscelyn G. Cockburn

[57] ABSTRACT

Described is a sequencing device comprising a plurality of shift register stages, a plurality of switches and an output bus which couples the outputs from the shift register stages to inputs of the switches. Each shift register stage includes a data input port coupled to a selected switch, a clock input port coupled to a clock control signal line and a clear input port coupled to a clear control signal line. The sequencing device may be set in at least one of a plurality of states by external events that are provided as input signals to the sequencing device through input bus (10).

3 Claims, 2 Drawing Sheets

PROGRAMMABLE SEQUENCING DEVICE FOR CONTROLLING FAST COMPLEX PROCESSES

DESCRIPTION OF THE INVENTION

1. Field of the invention

This invention relates to a standard sequencing device which may be offered as an off the shelf product. This device may be personalized for a given application and used for driving a complex process to be performed in a machine under control of external events.

2. Background of the Invention

In large machines which are now designed, such as data processing systems, teleprocessing systems, communication controllers, etc. sequencing devices are widely used to control the sequence of operations of specific components in the machine. For example, in the memory controller of the machine, a sophisticated device is needed to process the asynchronous refreshing operations of the memory along with the on line processing of permanent and intermittent failures for two different users, such as the processor and a direct memory access device, both issuing various types of concurrent accesses to the memory.

In such an environment, the number of operations which have to be performed depending upon external events and upon the state of the sequencing device is high.

Conventional sequencing devices are made of a counter comprising some kind of storage elements such as set/reset latches or JK flip-flops and a very intricate logic which may be implemented by means of a programmable logic array PLA, to control the counter state. A drawback of this type of storage elements is their ability to retain the information, once they have been set in a particular state.

The article published in the IBM Technical Disclosure Bulletin Vol. 20, No. 2, July 1977, pages 743–744 describes a system of this type which makes use of a conventional counter associated with a programmable logic array PLA which has a limited output width. The effective number of outputs is increased by using them to address a read only storage ROS. This scheme corresponds to the hardware implementation of a program. Its speed is limited since access to the PLA and to the storage are required. This makes it inappropriate for many applications where speed is required.

Furthermore, the major drawback of the conventional sequencing devices is their inability to be changed without completely re-designing the control logic or reprogramming the PLA, if a new situation must be handled or because the external events that control the sequence of operations are changed.

In addition, the design of the sequencing device must generally meet a number of conditions. For example, in no case the sequencing device should go into an undesired or unknown state because of an abnormal transient situation or because the case was not foreseen during the design and be stuck without any recovering. Any abnormal state should be cleared rapidly.

SUMMARY OF THE INVENTION

An object of the present invention is to provide a very simple sequencing device, which is responsive to external events and to its current status, to switch from one state to another state, each state controlling a specific operation of a machine.

Another object of the present invention is to provide such a sequencing device which may be easily modified to take into account additional events.

Another object of the present invention is to provide a masterslice comprising prediffused components of the sequencing device, which can be personalized according to the requirements of specific applications.

The sequencing device according to the present invention may be set into at least one selected state among a plurality of states, each state controlling an operation of a process in a machine, said selected state(s) depending upon external events which are provided as input signals to the sequencing device through an input bus (10).

It comprises a number n of shift register stages (SR) equal to the number of states, each stage having a data input, a clock signal input, a clear input, and an output. It also comprises means (16) for providing a clock signal on the clock signal inputs, and means (18) for providing a clear control signal on the clear inputs to reset the sequencing device.

The setting of the shift register stage is controlled by switching means (SW-1 to SW-n). These means have n output lines (14-1 to 14-n), each one of said line being connected to a corresponding data input of one shift register stage, and are responsive to selected input signals of the input bus and to selected signals on the shift register stage outputs, depending upon the desired sequence of states for generating an active signal on at least one of said n output lines, whereby at least one of the shift register stage is ON and provides an active signal on one line of the output bus under control of the clock signal, said signal being representative of the state of the sequencing device.

DETAILED DESCRIPTION OF THE PRESENT INVENTION

Figure 1:
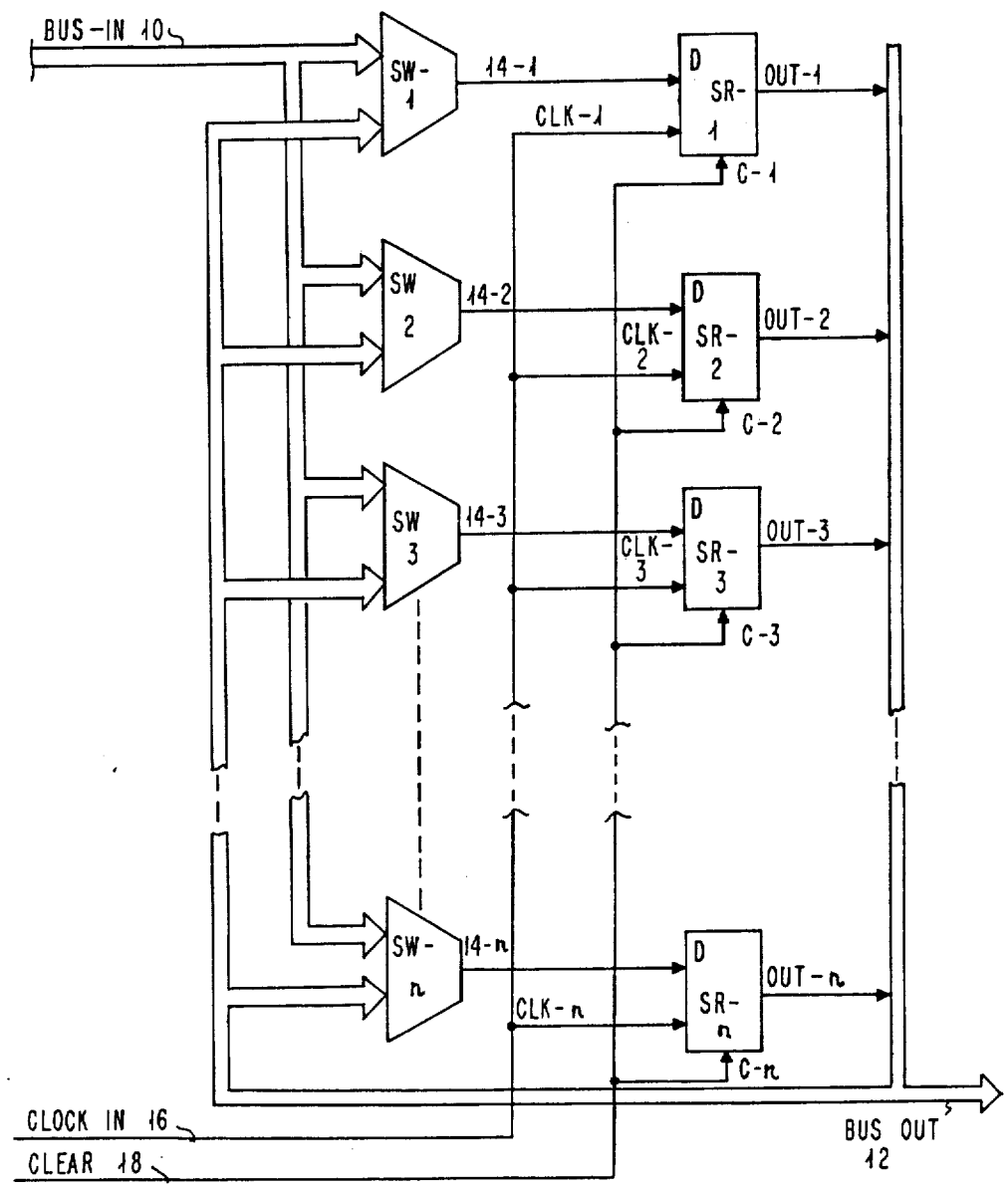
FIG. 1 shows the sequencing device according to the present invention.
Figure 2:
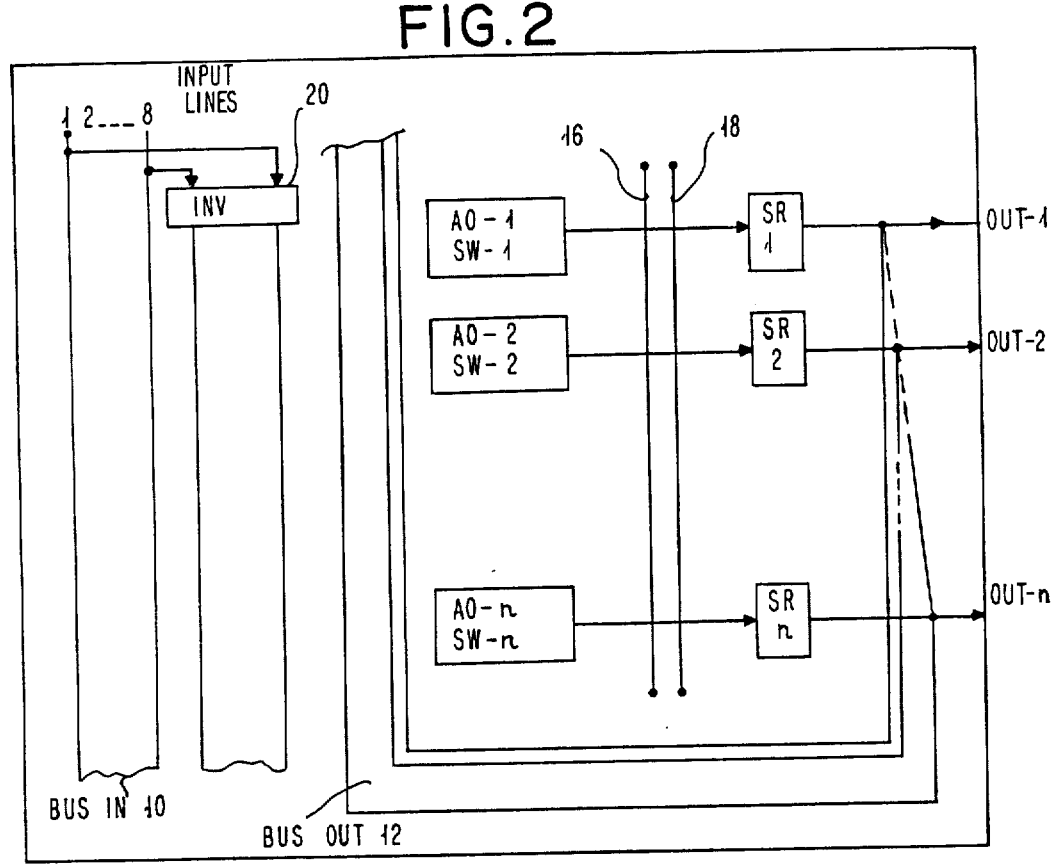
FIG. 2 shows the components pre-diffused in a masterslice which may be personalized to implement a specific sequencing control function.

The sequencing device according to the present invention comprises as many stages of shift register elements SR-1 to SR-n are needed. A single "ONE" or active level is circulated within the network of shift register stages, which may be viewed as a multi-dimensional shift register. At each stage, which may be considered as a node of the stage network, the possibility may exist, if needed, to route the circulating "ONE" from one node to another one depending upon the external events to change the state of the sequencing device.

At each stage SR-1 to SR-n is associated a switch SW-1 to SW-n. The external events are provided as input signals on the lines of input bus 10 to the switches SW-1 to SW-n. The output lines OUT-1 to OUT-n of the latches SR-1 to SR-n comprise the output bus 12. An active signal on one of these output lines corresponds to a given state of the sequencing device. Given lines of the output bus 12, which are selected according to the application, are also provided as inputs to the switches SW-1 to SW-n. The output lines 14-1 to 14-n of switches SW-1 to SW-n are provided to the data inputs of the stages SR-1 to SR-n respectively.

Each stage SR-1 to SR-n has a clock input CLK-1 to CLK-n which receives a clock signal from clock in line 16 and a clear input C-1 to C-n which receives a clear control signal from clear line 18.

Thus, the switches convey the "ONE" state of one stage to the data input of another stage under the control of the external events. The state of the sequencing device switches from a "coming from" state to a "going to" state. Depending upon the specific application, a plurality of "coming from" states may lead to at least one "going to" state.

The sequencing device is thus running at its maximum frequency and no decode of the sequencing device state is required since there is at least one of the lines OUT-1 to OUT-n of bus 12 which is active at a given instant, which corresponds to a given state of the sequencing device.

The sequencing device is assumed to have an idle state, i.e. a state in which the machine to be controlled is inoperative. This particular state may be indicated by an active level i.e. a ONE on one output line OUT-1 to OUT-n. It will be assumed that an active level on line OUT 1 is indicative of the idle state. Switch SW-1 detects that there is nothing circulating within the network of SR stages and causes stage SR-1 to be set whatever the input events are.

Thus, if something wrong has happened such as no matching conditions are found in the switches SW-2 to SW-n to route a "ONE" from a particular latch to another, the sequencing device returns to the idle state immediately.

On the contrary, in the prior art sequencing device one would be stuck, waiting for the condition that may never occur. Having an idle state is purely a question of definition. Any preferred state may play the role of the idle state in a sequencing device which is always active. A state common to all sequences may be chosen or a state pertaining to a preferred sequence or a specific warning state that will indicate to the machine that something wrong has happened.

The opposite may occur, unexpected conditions may lead to a multi-selection from a node. At that time, more than one "ONE" is circulating within the network. Although this situation may cause some temporary trouble, the extra "ONE" will disappear just by going, at worse, up to the end of the longest sequence to which it belongs, and there is a good chance that a no matching condition is found on its way. Moreover this may be detected by checking the parity of the whole network.

On the contrary, this kind of situation in which two or more states are selected may be desired by the designer depending upon the specific application of the sequencing device. This adds flexibility to the design of the sequencing device.

The sequencing device is easily alterable. If a transition from one state to another has to be added, removed or changed, it just affects a single from/to path. The addition of a new state, only needs a new SR stage together with the corresponding paths. Nothing else is changed.

According to the present invention the sequencing device may be prediffused in a master slice in the form of a number of shift register stages SR-1 to SR-n, and-OR logic circuits AO-1 to AO-n which have to be interconnected to perform the function of switches SW-1 to SW-n, input bus 10, inverter assembly 20 which provides on its output bus 21 the inverse of the signals on the lines comprising input bus 10, output bus 12 comprising the output lines 14-1 to 14-n of stages SR-1 to SR-n and clock and clear lines 16 and 18 respectively.

To implement a specific sequencing device intended to drive a specific process, the designer personalizes the master slice. To do this, the lines 16 and 18 are connected to the stages which are needed in the application. The connections of specific lines of the input bus 10, of bus 21 and of output bus 12 have to be made to the AND-OR logic circuits SW and the logic circuits SW have to be configured to cause the adequate transitions from one state to another state.

To make the masterslice personalization, the designer has only to describe all the desired transitions of the device i.e. the logical conditions which have to be met to go from one state to another one. The following table represents how it can proceed to make this description. It is assumed that the input bus 10 comprises 8 lines and that the desired sequencing device has 8 states. Thus eight stages in the masterslice will be connected to the control lines 16 and 18.

| TRANSITIONS | | | EXTERNAL EVENTS States of IN BUS 10 lines | COM- |
|---|---|---|---|---|
| INDEX | FROM | TO | 1 2 3 4 5 6 7 8 | MENTS |
| 1 | 1 | 1 | x x x x x x x x | idle state |
| 2 | 1 | 3 | 1 1 x 0 x x x x | |
| 3 | 1 | 4 | 0 x x 1 x x x 1 | |
| 4 | 2 | 3 | 0 x 1 x x 1 x x | |
| 5 | 2 | 5 | 1 0 x x x x 1 x | |
| 6 | 2 | 1 | 0 0 0 0 0 0 0 0 | |
| 7 | 3 | 4 | — | |
| 8 | 3 | 1 | — | |
| 9 | 4 | 3 | x x 1 1 x x x 1 | |
| 10 | 4 | 5 | — | |
| 11 | 4 | 1 | — | |
| 12 | 5 | 4 | — | |
| 13 | 5 | 2 | — | |
| 14 | 5 | 1 | — | |
| 15 | 6 | 3 | x x 1 x 1 x x 0 | |
| 16 | 6 | 1 | — | |
| 17 | 7 | 8 | — | |
| 18 | 7 | 1 | — | |
| 19 | 8 | 4 | — | |
| 20 | 8 | 5 | — | |
| 21 | 8 | 6 | — | |
| 22 | 8 | 1 | — | | x means don't care

The table is only given as an example. It comprises as many lines as necessary, to describe the behaviour of the sequencing device. Once the transitions are described, the implementation of the AND-OR logic circuits comprising the switches SW is straight-forward. The table is sorted by "going to" states, and the corresponding AOI logic circuits are laid out. Depending upon the complexity of the process to be controlled, the logic circuits may be too complex and redundant. Simplification may be achieved by the standard mechanisms used to implement logic functions.

Figure 3:
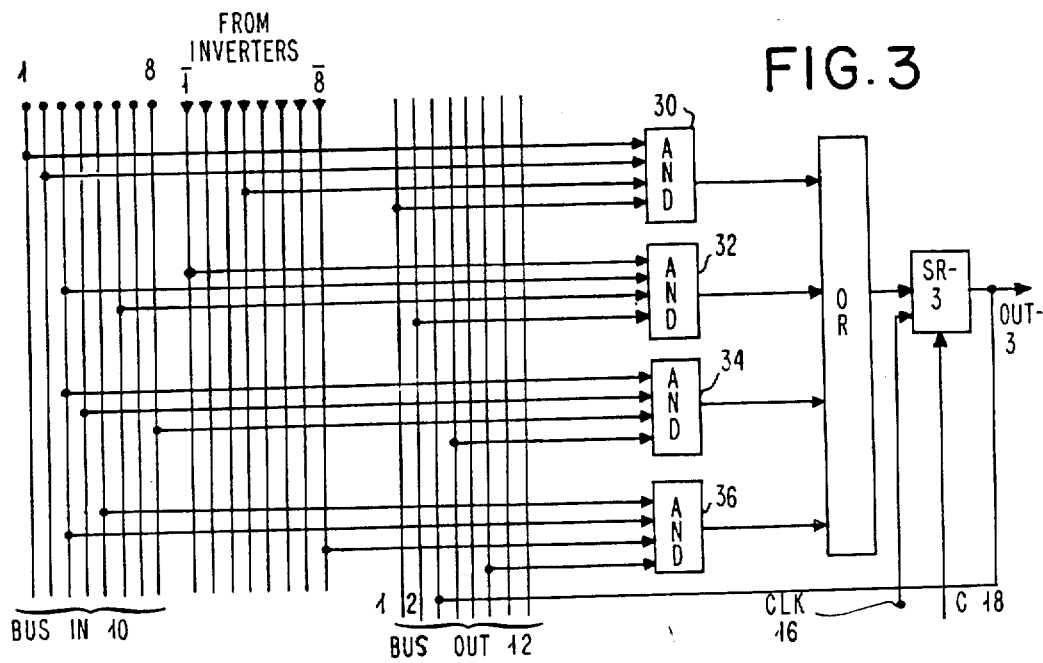
FIG. 3 shows a specific logic switching arrangement comprising AND and OR gates, which may be used to implement switch SW 3 of FIG. 1.

FIG. 3 shows the specific switching AND-OR circuits which has to be personalized to implement switch SW-3, which generates the signal on line 14-3 to set latch SR-3.

As shown in the table, the sequencing device may go into state 3, from state 1, state 2, state 4 and state 6. Accordingly, lines 1, 2, 4 and 8 of output bus 12 are provided to one input of AND gates 30, 32, 34 and 36. These AND gates are conditioned by input signals on lines 1 to 8 of bus 10, inverted or not as the case may be, depending upon the input conditions as described in the table. The output signals from AND gates 30, 32, 34 and 36 are provided to OR gate 38 which generates the SET signal on line 14-3.

Assuming that state 1 is the idle state, in the logic circuit comprising switch SW-1, one AND gate may be provided which is conditioned when all lines 2 to 8 of the bus 12 are inactive (down level), so that the sequencing device returns to the idle state in case of no matching condition is found to set one of the stages SR-2 to SR-8.

The above described masterslice will make it possible to implement very complex sequencing devices, to control sophisticated processes while retaining the ease of design and changes.

We claim:

1. A sequencing device which may be set into at least one selected state among a plurality of states, each state controlling the operation of a process in a machine, said selected state(s) depending upon external events which are provided as input signals to the sequencing device through an input bus (10), said device being characterized in that it comprises:

an output bus (12),
a number n of shift register stages (SR) equal to the number of states, each stage having a data input, a clock signal input, a clear input and an output which is coupled to the output bus,
means (16) for providing a clock signal on the clock signal input,
means (18) for providing a clear control signal on the clear input to reset the sequencing device,
switching means (SW-1 to Sw-n) coupled to the input bus and to the output bus and having n output lines (14-1 to 14-n), each one of said lines is coupled to a corresponding data input of one shift register stage, said switching means being conditionally responsive to input signals of the input bus and to signals on the output bus selected as a function of a desired sequence of states for generating an active signal on at least one of said n output lines, which is provided to the corresponding data input of the shift register stage which provides an active signal on its output under control of the clock signal, whereby the state of the sequencing device is set as a function of the states of the input signals and of its previous state.

2. Sequencing device according to claim 1, characterized in that the switching means comprise n logic arrangements, each one being conditioned by selected input signals of the input bus and by selected output signals of the output bus.

3. Sequencing device according to any one of claim 1 or 2, characterized in that one state of the sequencing device is an idle state indicated by a signal at the output of any stage dedicated to indicate this idle state, which becomes active in absence of external events or when none of the other stages is ON.

* * * * *